United States Patent [19]

Pirot et al.

[11] Patent Number: 5,306,573
[45] Date of Patent: Apr. 26, 1994

[54] MAGNETIC DEVICE AND PROCESS FOR PRODUCTION OF MAGNETORESISTIVE SENSORS ACCORDING TO THIS PROCESS

[75] Inventors: Francois-Xavier Pirot, Les Ulis; Jean-Marc Coutellier, Maurepas; Thierry Valet, Viroflay, all of France

[73] Assignee: Thomson-CSF, Puteaux, France

[21] Appl. No.: 4,650

[22] Filed: Jan. 14, 1993

Related U.S. Application Data

[63] Continuation of Ser. No. 812,128, Dec. 19, 1991, abandoned.

[30] Foreign Application Priority Data

Dec. 27, 1990 [FR] France ................ 90 16334

[51] Int. Cl.$^5$ ........................................ B32B 9/00
[52] U.S. Cl. .............................. 428/692; 156/625; 427/128; 427/129; 427/130; 427/131; 427/264; 427/275; 427/307; 427/355; 427/402; 428/693; 428/900
[58] Field of Search ............. 427/128-132, 427/264, 275, 307, 355, 402; 428/695, 692, 900, 693; 156/625

[56] References Cited

PUBLICATIONS

IBM Technical Disclosure Bulletin, vol. 32, No. 4B, pp. 51-53, Armonk, N.Y., Sep. 1989, Magnetoresistive Magnetic Recording Sensor.
IBM Technical Disclosure Bulletin, vol. 21, No. 12, p. 5002, K. E. Petersen, Thin Film Magnetic Heads May, 1979.

*Primary Examiner*—Bernard Pianalto
*Attorney, Agent, or Firm*—Oblon, Spivak, McClelland, Maier & Neustadt

[57] ABSTRACT

The invention relates to a process for producing a plurality of magnetoresistive sensors on the same substrate. The invention particularly has as its object to facilitate a polishing phase of this process. The process of the invention comprises depositing a layer of a magnetoresistive material on a substrate, and then forming in this layer a plurality of magnetoresistive elements. The process further comprises making, at the site of each sensor and before the depositing the magnetoresistive layer, an inclined surface, in such a way that each magnetoresistive element is formed on this inclined surface and exhibits an edge directed outward from the substrate.

19 Claims, 4 Drawing Sheets

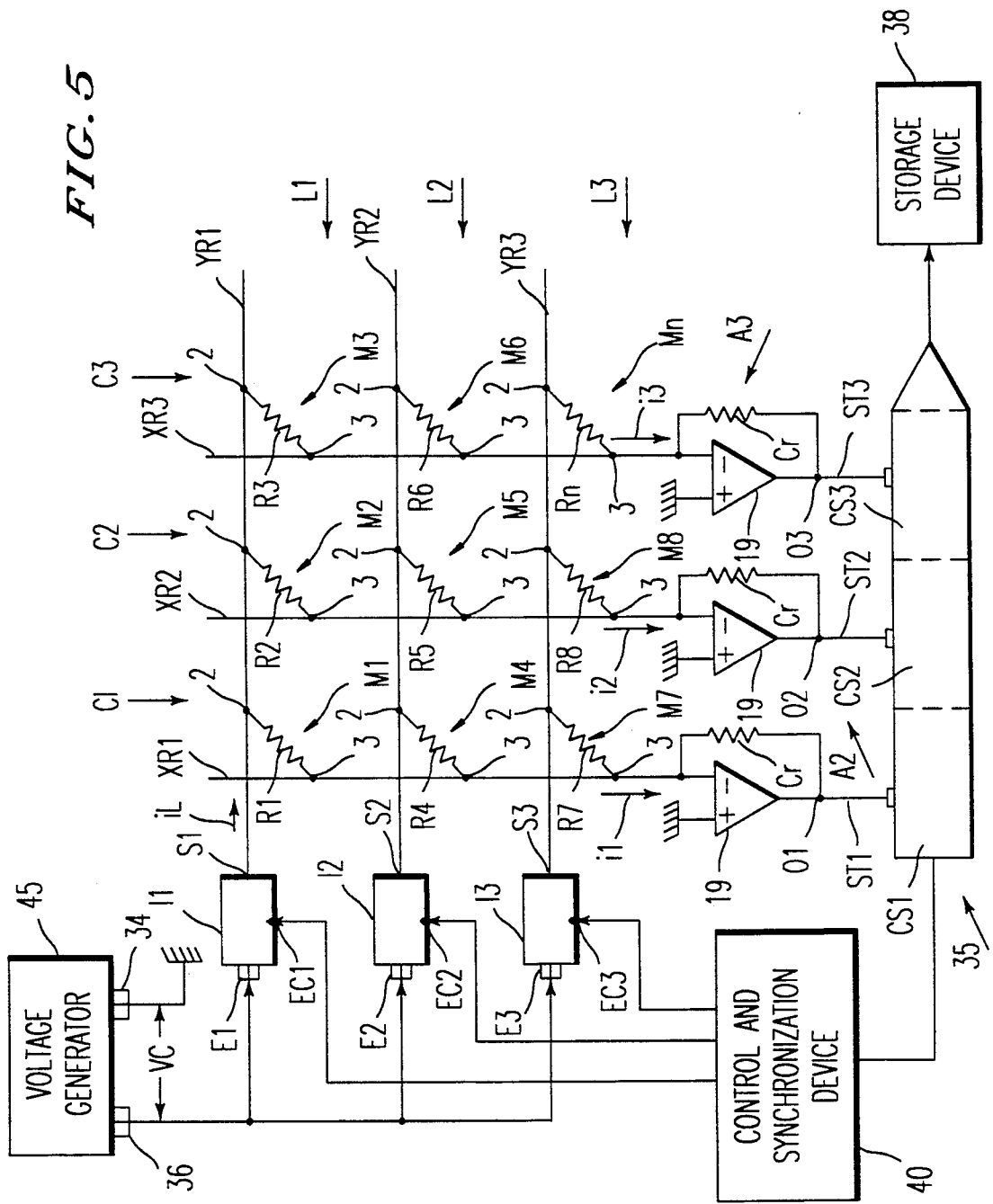

MAGNETIC DEVICE AND PROCESS FOR PRODUCTION OF MAGNETORESISTIVE SENSORS ACCORDING TO THIS PROCESS

This application is a Continuation of application Ser. No. 07/812,128, filed on Dec. 19, 1991, now abandoned.

BACKGROUND OF THE INVENTION

1. Field of the Invention

The present invention relates to a process for the production of magnetoresistive sensors. The process of the present invention makes it possible, in particular, to facilitate a collective production of these sensors.

2. Discussion of the Background

Structures using magnetoresistive effects are used in various fields, particularly in the field of magnetic recording, to detect a magnetic field placed on a support such as, for example, a tape or magnetic disk. These magnetoresistive sensors make it possible to be free of the limitations attached to inductive methods, particularly the requirement for a relatively high speed of advance of the magnetic tape in relation to the magnetic reading head.

In magnetoresistive sensors, a phenomenon is used in which the value of the ohmic resistance of certain materials varies as a function of the magnetization which prevails there This variation of resistance is detected using ordinary methods, for example, by detecting or measuring variations of intensity of an electric current.

The magnetoresistive sensors comprise an actual magnetoresistive element through which a measuring electric current passes. The magnetoresistive elements are made in such a way that the magnetic fields to be measured are perpendicular to the easy magnetization axis of the material and that the current passes parallel to this axis.

A constant so-called "polarization" magnetic field which causes the magnetization to rotate in relation to the easy axis can advantageously be added so that the variation of resistance is, on one hand, maximum and, on the other hand, linear as a function of slight field variations. This "polarization" can be caused in various known ways: for example, with a strong coercive field layer; or else using a current in a conductor close to the sensor; or else with a magnetically antiferromagnetic layer coupled to a sensitive resistor.

Other arrangements can further be made, particularly within the framework of magnetic recording where a very great space resolution is desired, arrangements which consist, for example, in producing layers of shielding on both sides of the magnetoresistive element.

Magnetoresistive elements are currently made of alloys such as, for example, permalloy ($Fe_{\approx 80} Ni_{\approx 20}$). Detailed explanations concerning the magnetoresistive effect and the making of magnetoresistive sensors can be found in an article by D. THOMPSON published in IEEE Transaction on Magnetics, vol. 11, No. 4, 1975, page 1039.

The various embodiments mentioned above are all more or less compatible with collective production methods. These methods use, in particular, thin layer film technologies and microlithography techniques, on a substrate common to a large number of magnetoresistive sensors. Thus, it is possible to greatly reduce costs, both for "individual" magnetoresistive sensors intended to operate individually after having been separated from the other sensors, and for sensors intended to be associated in operation and, for example, to form the elementary magnetic heads of a multitrack reading head.

Generally, the various production stages are common to all of the sensors formed on the same substrate, up to a polishing stage. The polishing stage has as its object, in particular, to define in a precise way a dimension (length or width) of the magnetoresistive elements. In the case, for example, where sensors arranged in rows and columns are made on the same substrate, it is necessary to cut the substrate into strips (along the rows or columns) and to polish the edges of the strips to define the edges of all the magnetoresistive elements carried by the strip. In the case of magnetic reading heads, the edges thus polished of the magnetoresistive elements are oriented toward the magnetic support to be read.

This polishing operation, thus performed strip by strip, constitutes a long, delicate and therefore costly operation.

Further, in the case of a matrix arrangement of magnetoresistive sensors (for a multitrack reading head, for example), it is necessary to add an operation of assembly of the various strips after polishing, whereas microlithography techniques make it possible to make rows and columns of sensors directly at the desired pitches.

SUMMARY OF THE INVENTION

Accordingly, one object of this invention is to provide a novel process for producing a plurality of magnetoresistive sensors placed in several rows on the same substrate. The process of the present invention makes possible a collective making of these sensors, including the polishing phase.

This object of the present invention is obtained by producing magnetoresistive elements in planes that are not parallel to the substrate, so that the magnetoresistive elements all have an edge directed outward from the substrate, and this edge is made accessible to polishing regardless of its position on the substrate.

According to the present invention, a process for production of a plurality of magnetoresistive sensors, comprises the steps of depositing at least one layer of magnetoresistive material on one face of a substrate, then, producing in this layer of magnetoresistive material, a plurality of magnetoresistive elements each corresponding to a sensor. Further, before the depositing of the layer of magnetoresistive material, and at the site of each sensor, the process produces in the face of the substrate a surface zone inclined in relation to the general plane of the face of the substrate, so that each magnetoresistive element is formed at least partially on one such inclined surface and exhibits an edge directed outward from the substrate.

The present invention is also directed to a magnetic device made by this process.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5 is a diagram which illustrates a matrix addressing method.

DESCRIPTION OF THE PREFERRED EMBODIMENTS

Figure 1:
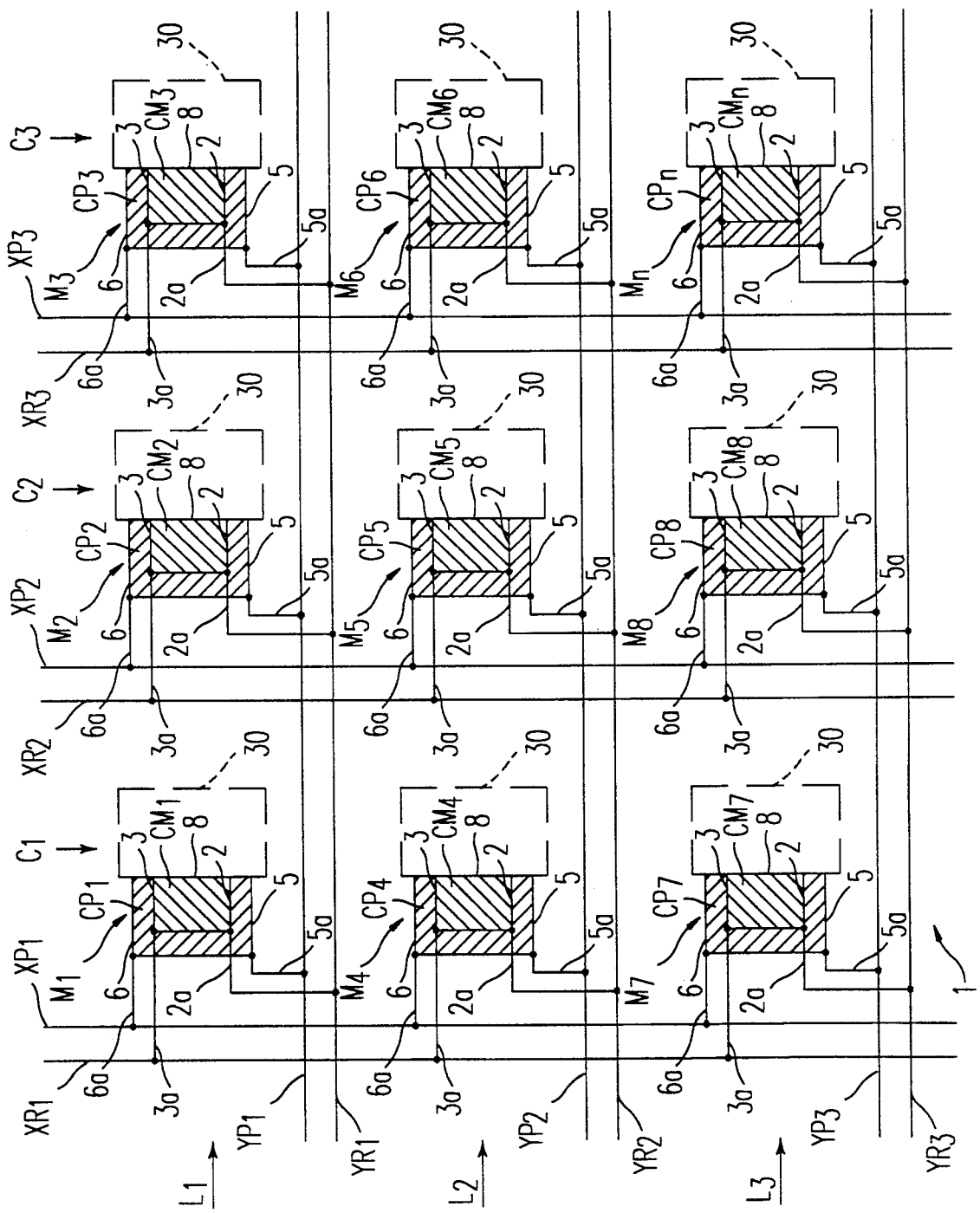
FIG. 1 diagrammatically represents a magnetic device of a type suitable to be produced by the process of the present invention.

Referring now to the drawings, wherein like reference numerals designate identical or corresponding parts throughout the several views, and more particularly to FIG. 1 thereof, which diagrammatically shows, by a top view, a magnetic unit 1 able to be made by the process of the present invention. Magnetic unit 1 comprises a plurality of magnetoresistive sensors M1 to Mn carried by the same substrate (not shown in FIG. 1). In the nonlimiting example described, sensors M1 to Mn form a matrix arrangement, for example to constitute the elementary reading heads of a multitrack magnetic reading head 1. Each sensor M1 to Mn can, however, be intended to constitute an independent sensor by separation from the other sensors, after the collective making of these sensors on the same substrate.

In the example shown in a nonlimiting way in FIG. 1, there are 9 sensors which are placed in three rows L1 to L3 and three columns C1 to C3, but of course the number N of these rows and the number m of these columns can be different, N and m each being able to be equal to or greater than 1.

In the nonlimiting example described, sensors M1 to Mn are of the type comprising a polarization magnetic field obtained using a current circulating in a layer referred to as a polarization layer. Consequently, each sensor M1 to Mn comprises a magnetoresistive layer CM1 to CMn and a polarization layer CP1 to CPn (partially masked) which in the view of FIG. 1, is located for example in a plane that is deeper than the magnetoresistive layers CM1 to CMn.

Magnetoresistive layers CM1 to CMn and polarization layers CP1 to CPn are electrically connected to conductors through which they are supplied with current; on the one hand, a first end 2 of each magnetoresistive layers CM1 to CMn is connected to a conductor of a main row conductor YR1 to YR3 placed parallel to rows L1 to L3, and on the other hand, the other end 3 of each magnetoresistive layers CM1 to CMn is connected to a conductor of a main column conductor XR1 to XR3 placed parallel to columns C1 to C3; this makes it possible to establish a measuring current in the magnetoresistive layers. For polarization layers CP1 to CPn, each of these layers is connected by a first end 5 to a conductor of a polarization row conductor YP1 to YP3 placed parallel to row L1 to L3, and by the other end 6 to a conductor of a polarization column conductor XP1 to XP3, placed parallel to columns C1 to C3. This makes it possible to establish a polarization current in the polarization layers.

Of course, this arrangement of conductors that is used for supplying the sensors applies particularly to a case where sensors M1 to Mn constitute a single unit such as a multitrack reading head 1. In the case where sensors M1 to Mn are intended to be independent, it is enough, for example, to provide linking conductors 2a, 3a and 5a, 6a for the electrical connections of each of these layers.

The process of the present invention lends itself particularly well to being used with standard microlithography techniques, which are already broadly applied in the field of magnetic heads of the multitrack type. It makes it possible to make sensors M1 to Mn by a series of operations which can be applied simultaneously to the making of each sensor, including the polishing phase.

In the prior art, the polishing phase requires dividing unit 1 into strips, in the direction of rows or columns L1 to L3, C1 to C3, to gain access to an edge of each magnetoresistive layer. In the nonlimiting example represented in FIG. 1, edge 8 to be polished of magnetoresistive layers CM1 to CMn is parallel to columns C1 to C3, and the cutting into strips should be performed in the direction of the columns to make possible the polishing operation, if the production of the sensors was performed according to the prior art.

With the process of the present invention, however, the polishing stage can also be made on all of sensors M1 to Mn, without a prior cutting of the substrate which carries these sensors.

For this purpose, according to a characteristic of the present invention, magnetoresistive layers CM1 to CMn and polarization layers CP1 to CPn of each sensor M1 to Mn are made at least partially on zones whose surface is inclined in relation to the general plane of the face of the substrate which carries these layers. The result is that an edge of these layers CM1 to CMn and CP1 to CPn is directed outward from the substrate, and is thus available for a polishing which can be carried out simultaneously for all of the sensors, parallel to the face of the substrate.

The inclined surface zones can be made in the substrate or more specifically on the face of the latter, in various ways: for example using a so-called additive (i.e., by addition of material) methods, such as for example epitaxy (particularly when the substrate is of the monocrystalline type) or any other method, for example a method of depositing a layer on a monocrystalline substrate or not; or using so-called subtractive methods, for example by photoengraving.

According to another characteristic of the present invention, this photoengraving consists in an anisotropic engraving revealing the crystalline planes of a monocrystalline substrate, such as for example of silicon, or of quartz, or further of gallium arsenide, etc.

FIGS. 2A, 2B, 2C, 2D, 2E, 2F and 2G illustrate various stages of the process of the present invention in a version with engraving of a substrate 11, of monocrystalline silicon for example. FIGS. 2A, 2B, 2C, 2D, 2E, 2F and 2G are sectional views of a magnetoresistive sensor (fifth sensor M5 for example) along an axis x—x shown in FIG. 1 at the level of this fifth sensor M5.

Figure 2:
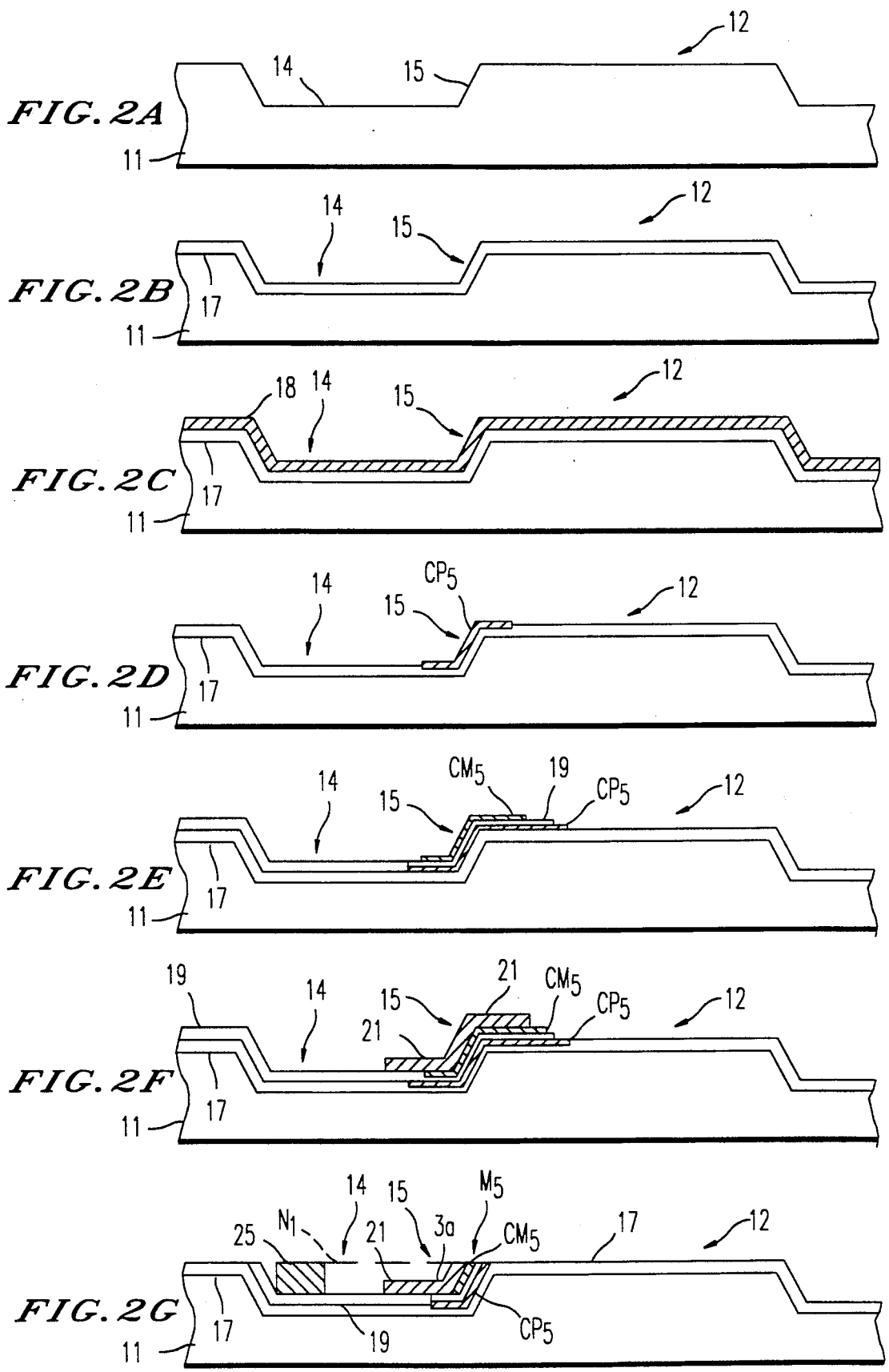
FIGS. 2A, 2B, 2C, 2D, 2E, 2F and 2G illustrates several stages of the process of the present invention.

FIG. 2A shows substrate 11 after an anisotropic engraving made in face 12 of the substrate.

This engraving produces in face 12 a recessed zone 14 having, for example, a depth on the order of 0.1 micrometer to 50 micrometers. Recess 14 joins face 12 by a zone 15 whose surface is inclined in relation to face 12. The slope of this inclined zone 15 is defined in particular by the crystalline structure of substrate 11, which exhibits a particular advantage of obtaining a very plane surface and a very reproducible angle, using a simple method. Nevertheless, the engraving can be made according to other methods standard in the art, which do not involve the crystalline structure.

Angle a1 formed between face 12 and inclined zone 15 is not critical, for example a value of this angle that is easy to obtain with a monocrystalline silicon substrate with an orientation <100>, is on the order of 54.74°; a value which is favorable to subsequent polishing.

Of course, this engraving is made on substrate 11 at the site provided for each sensor M1 to Mn.

FIG. 2B represents a following stage in which engraved face 12 of the substrate is covered with an insulating deposit 17 obtained, for example, by a silicon oxidation.

FIG. 2C shows that then a layer 18 of an electrically conductive material is deposited, which may be for example copper with a thickness, for example, on the order of 0.5 micrometer to 50 micrometers.

FIG. 2D shows that layer 18 has been engraved (by photolithoengraving), to constitute a polarization layer CP5 covering inclined zone 15 and going beyond the latter into recess 14 and on face 12.

FIG. 2E shows a stage in which polarization layer CP5 is covered by a magnetoresistive layer CM5 from which it is separated by a second insulating layer 19. Second insulating layer 19 is a layer of SiO$_2$, for example, deposited on polarization layer CP5. Magnetoresistive layer CM5 deposited on second insulating layer 19 is, for example, (magnetoresistive) permalloy having a thickness on the order of 0.5 micrometer to 1 micrometer. After photolithoengraving, on one side magnetoresistive layer CM5 passes beyond in relation to face 12 of the substrate, and on the other side it is located in recess 14 without entirely covering polarization layer CP5, so as to allow access to the ends of the latter to connect linking conductors 5a, 6a, shown in FIG. 1, there.

FIG. 2F illustrates the making of linking conductors 2a, 3a and 5a, 6a (shown in FIG. 1) using a conductive layer 21, of copper for example, which is deposited on substrate 11 over the magnetoresistive layer. After photolithoengraving, conductive layer 21 exists only at the site of the linking conductors; in fact, in FIG. 2F it represents, for example, a connection link 3a of magnetoresistive layer CM5, a connection which is located in a plane that is deeper than the one of the figure.

FIG. 2G represents the magnetoresistive sensor M5 that is obtained after a polishing operation performed over all of substrate 11, i.e., simultaneously over all the sensors thus made. This operation leads to removing material parallel to face 12 of the substrate, up to an appropriate level N1 to impart the desired dimension to magnetoresistive layer CM5. The edge i.e., edge 8 of magnetoresistive layer CM5 is then flush with the surface of substrate 11, or more precisely flush with insulating layer 17 whose thickness in the nonlimiting example shown in FIG. 2G, has been reduced by polishing. This surface covered by insulating layer 17 and which is at level N1 to be reached by polishing, constitutes a high surface 30 which can, for example, separate two consecutive sensors; these high surfaces 30 are shown in dotted lines in FIG. 1. This makes it possible in operation to establish a very slight distance from the magnetic support, and therefore to maximize the signal received from this magnetic support not shown).

The polishing stage can be additionally facilitated by making shims 25 whose top is at level N1 to be reached by polishing. In the nonlimiting example, these shims 25 are made in recess 14, for example by depositing, then photolithoengraving a layer that is resistant to polishing for a much longer time than magnetoresistive layer CM5 so as, for example, to reduce greatly the polishing speed when level N1 is reached. For example, in the case of a magnetoresistive layer CM5, of permalloy, shim 25 can be made from a layer of adamantine carbon, or of silicon dioxide, or else of silicon nitride; this layer being deposited for example just after the photolithoengraving of the linking conductors. It should be noted that shim 25 can also consist of a plane layer exhibiting a surface larger than that of the materials to be polished.

The various operations mentioned above are shown with reference to a single sensor to simplify the description, but of course they are followed simultaneously for all sensors M1 to Mn.

Figure 3:
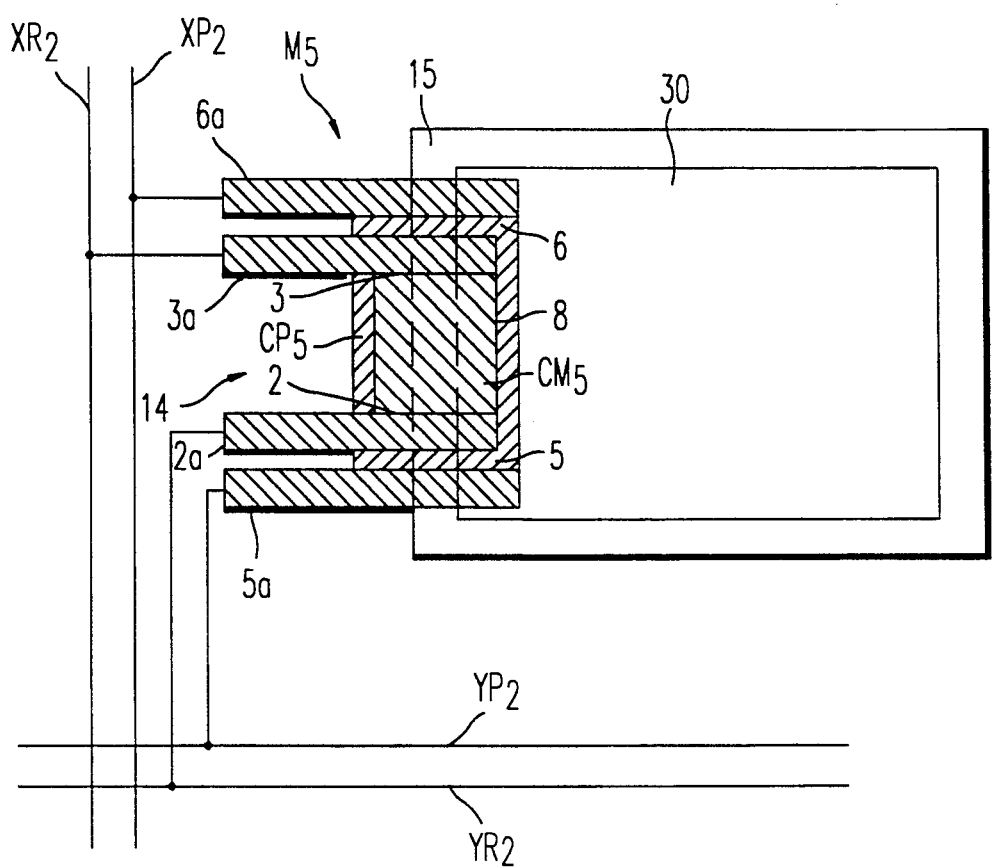
FIG. 3 is a top view of a magnetoresistive sensor shown in FIG. 2, before a polishing stage.

FIG. 3 is a top view which makes it possible to locate various elements of sensor M5 before the polishing phase. Magnetoresistive layer CM5 appears above polarization layer CP5, this latter having a larger surface. Magnetoresistive layer CM5 and polarization layer CP5 are approximately centered above inclined zone 15, and go beyond into recess 14 (approximately plane) and toward high surface 30. In FIG. 3, inclined zone 15 appears between two rectangles, the smaller of which represents high surface 30, and the other represents the bottom of inclined zone 15 where it joins the recessed surface 14.

The two linking conductors 2a, 3a are connected to opposite ends 2, 3 of magnetoresistive layer CM5; and the two linking conductors 5a, 6a are connected to ends 5, 6 of polarization layer CP5. On the other hand, these linking conductors are further connected to corresponding row and column conductors YR2, XR2 and YP2, XP2, as shown in FIG. 1.

The making of row and column conductors YR1 to YR3, XR1 to XR3 and YP1 to YP3, XP1 to XP3 is not explained because it is entirely standard in the art, by conventional methods of microlithography in particular.

Figure 4:
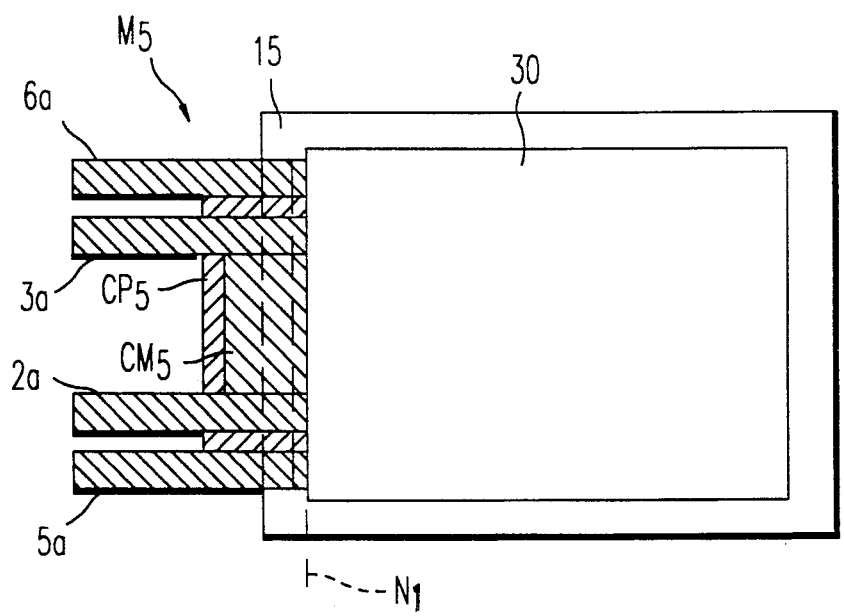
FIG. 4 is view of the sensor of FIG. 3, after the polishing stage.

FIG. 4 is a top view similar to FIG. 3, and shows sensor M5 after the polishing operation. To simplify FIG. 4, the row and column conductors are not shown.

After polishing, edge 8 of the magnetoresistive layer is at level N1 which corresponds to the edge of high surface 30; the magnetoresistive layer then has its final dimension.

The method which has just been explained can be applied as well to magnetoresistive sensors of a different type; for example, to types without a polarization layer through which a current is passed, or to a type with an antiferromagnetic layer, etc. The important thing is that magnetoresistive layers of the sensors are made, at least partially, in a plane that is not parallel to the face of the substrate which carries the sensors, to make the edge of all the magnetoresistive layers simultaneously available for polishing.

The possibility of polishing all the sensors without separating them into strips is particularly advantageous in the case of matrix devices forming, for example, a matrix reading head or multitrack head as shown in FIG. 1, because it avoids having to assemble the various strips after polishing; the various magnetoresistive sensors can be made directly on the substrate, at the desired pitch for the operation. The process of the present invention is therefore particularly advantageous to use for the production of multitrack magnetic reading heads.

The acquisition of signals delivered by the various magnetoresistive sensors can be performed in various ways, but the larger the number of these sensors the more advantageous it is to perform this acquisition by a matrix type addressing.

FIG. 5 diagrammatically illustrates a matrix addressing method able to be applied to magnetic device 1 shown in FIG. 1; this method is already described in a French patent application No. 90 09302 in the name of the applicant of the present invention.

Magnetoresistive sensors M1 to Mn of FIG. 1 each comprise a polarization layer CP1 to CPn and a magnetoresistive layer CM1 to CMn.

These polarization layers can be passed through by a polarization current continuously, so that they do not play any role in the addressing; also to simplify FIG. 5, neither of these polarization layers nor polarization conductors YP1 to YP3 and XP1 to XP3 have been shown. On the other hand, magnetoresistive layers CM1 to CMn constitute resistors whose value varies with the variations of the magnetic field to be measured, and consequently sensors M1 to Mn are represented in the form of resistors R1 to Rn.

Each resistor R1 to Rn is connected by a first end 2 to a row conductor YR1 to YR3, and by its second end 3 to a column conductor XR1 to XR3.

A voltage generator 45 produces a control direct voltage VC intended to be applied to the terminals of resistors R1 to Rn. Each row conductor YR1 to YR3 receives one of the polarities of control voltage VC by a switching element I1, I2, I3. Each switching element can be put either in a "blocked" state or in a "passing" state; in the "blocked" state, switching element I1 to I3 exhibits a very great impedance, and in the "passing" state it exhibits a very slight impedance.

Voltage generator 45 delivers both polarities of control voltage VC by two outputs 34, 36 the first of which is connected to a reference voltage such as ground for example; the second output 36 delivering the second polarity is connected to an input E1 to E3 of all the switching elements I1 to I3.

Outputs S1, S2, S3 of switching elements I1, I2, I3 are each connected to a respective row conductor YR1, YR2, YR3.

Switching elements I1 to I3 fulfill a switch function, they open or close the circuit between the second polarity of control voltage VC and each of row conductors Y1 to Y3. These switching elements can consist of various components standard in the art, for example the contacts of an electromechanical relay; but for questions of switching speed, it can be more advantageous to use electronic gates, of the analog type, for example MOS transistors which can exhibit "passing" or "blocked" states compatible with those which are necessary in this application, with rapid transitions.

With such an arrangement, selected sensors M1 to Mn are activated row by row L1, L2, L3 by applying control voltage VC only to corresponding resistors R1 to R9, by controlling the "passing" state of corresponding switching elements I1 to I3. For this purpose a control input Ec1 to Ec3 of each of the switching elements is connected to a control and synchronization device 40 standard in the art; this latter delivers, for example, a control signal to the switching element to render "passing," and in the absence of this signal each switching element maintains the "blocked" state.

Further, on the one hand, all column conductors XR1, XR2, XR3 are constantly carried at the potential of the reference voltage, i.e., at ground in the present example, this potential corresponding to the first polarity of control voltage VC; and on the other hand, all the column conductors are each constantly connected to a current sensor A1, A2, A3.

In the nonlimiting example, the current sensors are mounted in series between each column conductor XR1 to XR3 and the first polarity of the control voltage. Consequently, these current sensors A1 to A3 each comprise an amplifier 19 of the operational amplifier type for example, according to a standard mounting which, with an amplifier having a sufficient gain makes it possible to obtain an almost zero input impedance. In the nonlimiting example described, each amplifier 19 comprises a positive input (+), a negative input (−), and an output O1, O2, O3, with a negative feedback resistor Cr connected between its negative input (−) and outputs O1 to O3. Each column conductor XR1 to XR3 is connected to a negative input (−) of an amplifier 19. Each amplifier positive input + is connected to the potential of ground, in such a way that this potential is delayed on each column conductor XR1 to XR3 through a very slight impedance. Outputs O1 to O3 of amplifiers 19 deliver a voltage signal whose amplitude is a function of the current which circulates in column conductors XR1 to XR3.

In this configuration, the addressing of a row L1 to L3 of selected sensors is performed by controlling putting corresponding switching elements I1 to I3 in the "passing" state. The control voltage is then applied to resistors R1 to Rn of this selected row, which can cause, on the one hand, in corresponding row conductor YR1 to YR3 a row current iL which is the sum of the currents in all resistors R1 to Rn of this row; and which can cause on the other hand, in each column conductor XR1 to XR3, a current i1 to i3 belonging to each resistor R1 to Rn, i.e., to each of sensors M1 to Mn which form addressed rows L1 to L3. Thus, for example, if the addressed row is the first row L1: current i1 which circulates in the first column conductor XR1 corresponds to the current of first sensor M1; currents i2 and i3 which circulate respectively in the second and third column conductor XR2 and XR3 correspond respectively to the second and third sensors M2, M3. When the second switching element I2 is "passing" the other elements I1, I3 are "blocked," and currents i1, i2 and i3 correspond respectively to the fourth, fifth and sixth sensors M4, M5, M6; and these currents are the ones which come from the seventh, eighth and ninth sensors M7, M8, M9 when the third switching element I3 is rendered "passing."

Since control voltage VC is applied through a slight impedance to row conductor Y1 to Y3 of selected rows L1 to L3, while the other row conductors of the rows not selected are in series with a very high impedance, resistors R1 to Rn of the sensors not selected in practice have no influence on currents i1 to i3 which circulate in column conductors XR1 to XR3 and which are injected into amplifiers 19.

Currents i1 to i3 are converted into voltage signals ST1 to ST3 by amplifiers 19, and these voltage signals are charged in a way standard in the art, in an acquisition register 35. Acquisition register 35 is a shift register for example, comprising storage cases CS1 to CS3, each able to store an analog value. Acquisition register 35 comprises as many storage cases CS1 to CS3 as there are column conductors XR1 to XR3, and each amplifier output O1 to O3 is connected to one such storage case.

The charging of voltage signals ST1 to ST3 are accomplished simultaneously for an entire row L1 to L3, and between each charging in acquisition register 35, the data contained in the latter can be transferred into a storage device 38 under the control of control and synchronization device 40. Thus, it is possible to address sensors M1 to Mn row by row L1 to L3, and in particular cyclically, at a speed which is linked to the size of the data placed on a magnetic tape to be read and to the displacement speed of this tape.

Of course, it is possible to use many other methods, all known to the specialist, to achieve the acquisition of voltage signals ST1 to ST3 delivered by amplifiers A1 to A3: for example, the amplifier outputs can be connected to acquisition devices not shown that are independent of one another.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for producing a plurality of magnetoresistive sensors, comprising the steps of:
    forming at least one recess on a face of a substrate, each recess having a bottom surface and a side surface zone, wherein the side surface zone is inclined in relation to a plane of the face of the substrate;
    depositing at least one layer of magnetoresistive material on said at least one inclined side surface zone and on said face of said substrate, so that said at least one layer of magnetoresistive material exhibits an edge directed outward from the substrate;
    forming at least one magnetoresistive element in the at least one layer of magnetoresistive material, each magnetoresistive element corresponding to a magnetoresistive sensor;
    forming at least one shim in the at least one recess so that a top level of the shim is flush with a level to be reached in a polishing phase and a bottom level of the shim is on the bottom surface of the recess; and
    polishing said at least one magnetoresistive element, the shim thereby reducing the speed at which the polishing is performed when the polishing reaches the top level of the shim.

2. The process according to claim 1, where the at least one inclined surface zone is formed by photoengraving.

3. The process according to any one of claims 1 or 2, further comprising the step of forming a polarization layer on each of the at least one inclined surface zones.

4. The process according to any one of claims 1 or 2, wherein the substrate is a monocrystalline substrate.

5. The process according to claim 4, wherein the substrate is of monocrystalline silicon.

6. The process according to any one of claims 1 or 2, wherein the step of forming the at least one inclined surface zone further comprises an anisotropic photoengraving revealing crystalline planes of the substrate.

7. The process according to claim 6, further comprising the step of forming at least one shim near the at least one inclined surface zone so as to be flush with a level to be reached in the polishing phase, to thereby reduce the speed at which the polishing is performed when this level is reached.

8. The process according to any one of claims 1 or 2, wherein the step of forming the at least one inclined surface zone further comprises an addition of material on the substrate.

9. The process according to claim 8, further comprising the step of forming at least one shim near the at least one inclined surface zone so as to be flush with a level to be reached in the polishing phase, to thereby reduce the speed at which the polishing is performed when this level is reached.

10. A magnetic device comprising a plurality of magnetoresistive sensors obtained by the process according to any one of claims 1 or 2, the sensors being carried by the same substrate, each sensor comprising a magnetoresistive element, wherein the magnetoresistive elements are at least partially in planes inclined in relation to a face of the substrate.

11. The process according to claim 1, wherein the shim reduces the speed at which the polishing is performed by being formed of a material more resistant to polishing than the layer of magnetoresistive material.

12. A magnetoresistive sensor formed by a process comprising the steps of:
    forming at least one recess on a face of a substrate, each recess having a bottom surface and a side surface zone, wherein the side surface zone is inclined in relation to a plane of the face of the substrate;
    depositing at least one layer of magnetoresistive material on said at least one inclined side surface zone and on said face of said substrate, so that at least one layer of magnetoresistive material exhibits an edge directed outward from the substrate;
    forming at least one magnetoresistive element in the at least one layer of magnetoresistive material, each magnetoresistive element corresponding to a magnetoresistive sensor;
    forming at least one shim in the at least one recess so that a top level of the shim is flush with a level to be reached in a polishing phase and a bottom level of the shim is on the bottom surface of the recess; and
    polishing said at least one magnetoresistive element, the shim thereby reducing the speed at which the polishing is performed when the polishing reaches the top level of the shim.

13. The magnetoresistive sensor formed by the process according to claim 12, where the at least one inclined surface zone is formed by photoengraving.

14. The magnetoresistive sensor formed by the process according to any one of claims 12 or 13, further comprising the step of forming a polarization layer on each of the at least one inclined surface zones.

15. The magnetoresistive sensor formed by the process according to any one of claims 12 or 13, wherein the substrate is a monocrystalline substrate.

16. The magnetoresistive sensor formed by the process according to claim 15, wherein the substrate is of monocrystalline silicon.

17. The magnetoresistive sensor formed by the process according to any one of claims 12 or 13, wherein the step of forming the at least one inclined surface zone further comprises an anisotropic photoengraving revealing crystalline planes of the substrate.

18. The magnetoresistive sensor formed by the process according to any one of claims 12 or 13, wherein the step of forming the at least one inclined surface zone further comprises an addition of material on the substrate.

19. The magnetoresistive sensor formed by the process according to claim 12, wherein the shim reduces the speed at which the polishing is performed by being formed of a material more resistant to polishing than the layer of magnetoresistive material.

* * * * *